United States Patent
Lin et al.

(10) Patent No.: US 6,289,748 B1
(45) Date of Patent: Sep. 18, 2001

(54) SHAFT TORQUE SENSOR WITH NO AIR GAP

(75) Inventors: Yingjie Lin; Daniel J. Moreno, both of El Paso, TX (US); Lorenzo Guadalupe Rodriguez, CD Juarez (MX)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/448,360

(22) Filed: Nov. 23, 1999

(51) Int. Cl.[7] .................................................. G01L 3/02
(52) U.S. Cl. ........................................................ 73/862.331
(58) Field of Search ......................... 73/862.331–862.336

(56) References Cited

U.S. PATENT DOCUMENTS

| | | | |
|---|---|---|---|
| 4,541,674 | * 9/1985 | Mitschang | 308/6 |
| 4,541,819 | * 9/1985 | Mazziotti | 464/144 |
| 4,887,461 | * 12/1989 | Sugimoto et al. | 73/118.1 |
| 5,526,704 | * 6/1996 | Hoshina et al. | 73/862.335 |
| 6,083,137 | * 7/2000 | Kato et al. | 476/8 |

* cited by examiner

Primary Examiner—Benjamin R. Fuller
Assistant Examiner—Jewel V. Thompson
(74) Attorney, Agent, or Firm—Margaret A. Dobrowitsky

(57) ABSTRACT

A magnetostrictive sensor for outputting a signal representative of torque on a shaft includes one or more excitation coils that generate magnetic flux which permeates the shaft and pickup coils that detect the flux after the flux passes through the shaft. Torque on the shaft affects the magnetic flux passing through the shaft. A coupling member such as plural rollers or powder metal poles are disposed in the flux path and touch the shaft such that no air gap exists in the flux path. Consequently, the sensor is comparatively sensitive, and is not unduly effected by shaft run-out.

26 Claims, 3 Drawing Sheets

SHAFT TORQUE SENSOR WITH NO AIR GAP

BACKGROUND OF THE INVENTION

1. Field of the Invention

The present invention relates generally to rotating shaft torque sensors.

2. Description of the Related Art

Sensors to measure the torque imposed on rotating shafts, such as but not limited to shafts in vehicles, are used in many applications. For example, it might be desirable to measure the torque on rotating shafts in a vehicle's transmission, or in a vehicle's engine (e.g., the crankshaft), or in a vehicle's automatic braking system (ABS) for a variety of purposes known in the art.

To this end, magnetostrictive torque sensors have been provided wherein a sensor is positioned in a surrounding relationship with a rotating shaft, with an air gap being established between the sensor and shaft to allow the shaft to rotate without rubbing against the sensor. A magnetic field is generated in the sensor by passing electric current through an excitation coil of the sensor. This magnetic field permeates the shaft and returns back to a pick-up coil of the sensor.

The output of the pick-up coil is an electrical signal that depends on the total magnetic reluctance in the above-described loop. Part of the total magnetic reluctance is established by the air gap, and part is established by the shaft itself, with the magnetic reluctance of the shaft changing as a function of torque on the shaft. Thus, changes in the output of the pick-up coil can be correlated to the torque experienced by the shaft.

As understood herein, the air gap, heretofore necessary to permit relative motion between the shaft and sensor, nonetheless undesirably reduces the sensitivity of conventional magnetostrictive torque sensors. As further understood herein, it is possible to eliminate the air gap between a shaft and a magnetostrictive torque sensor, thereby increasing the sensitivity of the sensor vis-a-vis conventional sensors. Moreover, the present invention recognizes that a phenomenon known in the art as "shaft run-out" can adversely effect conventional magnetostrictive torque sensors, and that a system can be provided that is relatively immune to the effects of shaft run-out. Accordingly, the present invention provides the solutions set forth herein.

SUMMARY OF THE INVENTION

A torque sensing system for generating an electrical signal representative of torque on a shaft defining a longitudinal axis and a radial dimension includes at least one excitation coil that is connectable to a source of electricity to generate magnetic flux. The flux permeates the shaft when the excitation coil is juxtaposed with the shaft. At least one pickup coil is configured to receive magnetic flux from the shaft, with the flux defining a flux path from the excitation coil to the pickup coil. Preferably three bearings engage the shaft and are disposed in the flux path such that no air gap exists in the flux path.

In a preferred embodiment, the bearings and coils are held in a hollow housing that surrounds the shaft. Within the housing a pickup coil is disposed radially outwardly of an associated excitation coil and is aligned with the excitation coil. Also, the bearings include plural rollers.

In one embodiment as shown and described further below in reference to FIGS. 2 and 3, a bearing inner ring is disposed between the rollers and the shaft such that the rollers directly contact the bearing inner ring to rollably engage the shaft with the housing. In this embodiment, first, second, and third high permeability regions are on the shaft, and the high permeability regions are longitudinally separated from each other by flux directing regions. Each bearing is aligned in the radial dimension with a respective high permeability region. In contrast, each excitation/pickup coil pair is radially aligned with a respective flux directing region.

As disclosed in greater detail below, the flux directing regions include plural slots that define an oblique angle relative to the axis, preferably an angle of 45°. In a particularly preferred embodiment, first and second flux directing regions have slots formed in them, with the slots in the first flux directing region being orthogonal to the slots in the second flux directing region.

In an alternate embodiment as shown and described further below in reference to FIGS. 4 and 5, no inner ring is provided, such that the rollers directly contact the shaft. In this embodiment, the rollers are arranged in sets. Each set of rollers includes front and rear pickup rollers that are aligned parallel to the axis of the shaft, and a middle excitation roller is disposed longitudinally between the pickup rollers and is offset from the line defined by the pickup rollers by an angle of 45°.

In still another embodiment as shown and described further below in reference to FIGS. 6 and 7, a torque sensing system for generating an electrical signal representative of torque on a shaft includes a sensor housing surrounding the shaft, and plural pairs of excitation/pickup coils arranged as in the above two embodiments. In this embodiment, the coils are magnetically coupled not by rollers, but by plural poles that slide along the shaft as the shaft rotates. In any case, no air gap is present in the flux path.

Preferably, in this last embodiment four sensor cores are provided on the shaft, and each core includes front and rear pickup poles and a longitudinally intermediate excitation pole that is offset from the line defined by the pickup poles by 45°. With this pole arrangement, each sensor core forms a "V" shape in the longitudinal dimension. As intended herein, each sensor core is made of powder metal that includes spherical powder constituents. Preferably, each constituent has a diameter of less than three microns.

In another aspect, a system for measuring torque on a shaft includes the shaft, and at least one excitation coil is juxtaposed with the shaft. Also, the system includes at least one pickup coil juxtaposed with the shaft. In accordance with present principles, an airless flux path is defined from the excitation coil, to the shaft, and back to the pickup coil, such that the pickup coil generates a signal representative of torque on the shaft.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
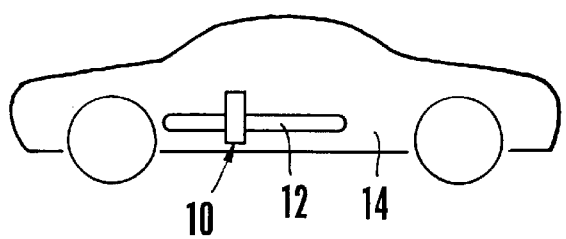
FIG. 1 is a schematic side view of a vehicle incorporating the present torque sensing system.

Referring initially to FIG. 1, a torque sensing system is shown, generally designated 10. As shown, the system 10 is disposed in a surrounding relationship with a shaft 12 to sense the torque imposed on the shaft 12. In one exemplary embodiment, the shaft 12 is a rotating shaft within a vehicle 14. For instance, the shaft 12 can be an ABS shaft, engine shaft, or transmission shaft, although it is to be appreciated that the principles set forth herein apply equally to other vehicular and non-vehicular rotating shafts.

Figure 2:
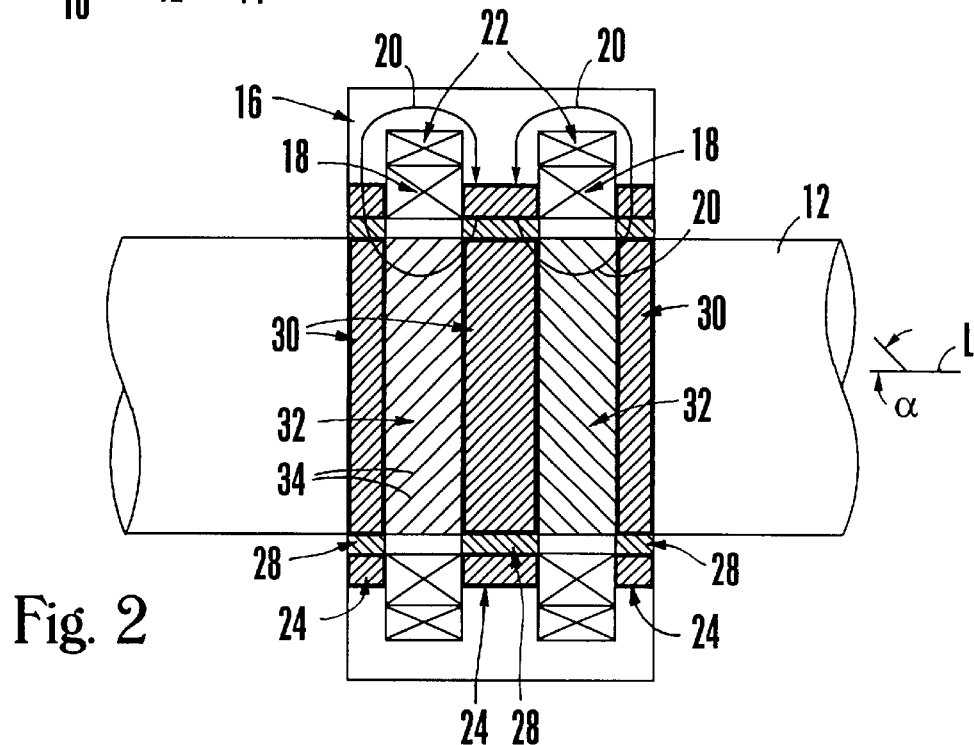
FIG. 2 is a schematic side cross-section view of a first embodiment of the torque sensing system, in operable engagement with a rotating shaft.
Figure 3:
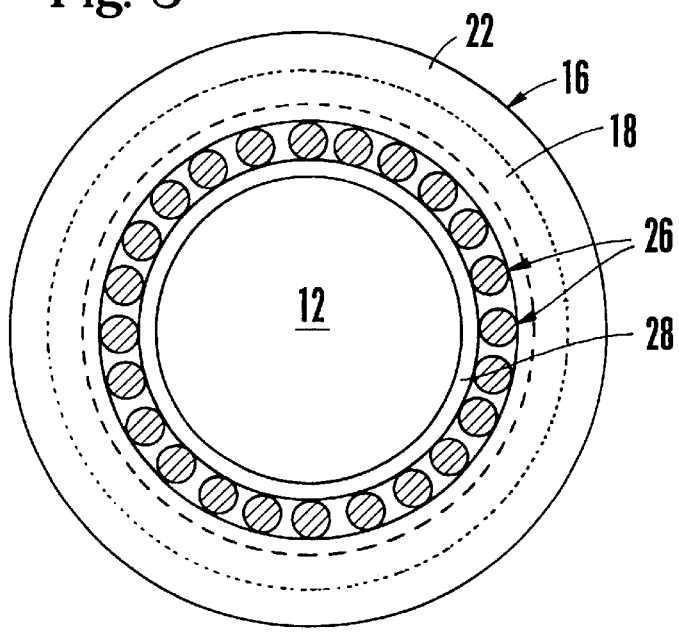
FIG. 3 is a schematic transverse cross-section view of the system shown in FIG. 2.

Now referring to FIGS. 2 and 3, a first embodiment of the system 10 is shown. As shown, the system 10 includes a hollow sensor housing 16 that is configured for surrounding the shaft 12. In the preferred embodiment, excitation coils 18 that are longitudinally spaced from each other are held in the housing 16 as shown, it being understood that each excitation coil 18 can be connected to a source of electricity to generate magnetic flux, represented by flux lines 20 in FIG. 2. In accordance with magnetostrictive principles known in the art, the flux permeates the shaft 12 when the excitation coils 18 are juxtaposed with the shaft 12.

As also shown best in the exemplary embodiment of FIG. 2, disposed radially outwardly of each excitation coil 18 and aligned therewith in the radial dimension can be a respective pickup coil 22 that is configured to receive magnetic flux from the shaft 12. The skilled artisan will appreciate that the flux defines a flux path from each excitation coil 18 to its respective pickup coil 22. Other flux sensors can be used within the scope of the present invention, e.g., Hall effect sensors can be used, or inductance changes in the excitation coil 18 can be measured and used, or other inductance change sensors known in the art can be used.

In accordance with the present invention, to magnetically couple the excitation coils with the pickup coils without an air gap in the flux path, thereby promoting sensor sensitivity, one or more, preferably three, bearings 24 are disposed in the flux path in physical contact with the shaft 12. The bearings 24 can be slide bearings but in the embodiment shown the bearings 24 are roller bearings. Accordingly, as shown in FIG. 3 the bearings 24 include plural rollers 26 that rollably engage an inner bearing ring 28 that is on the shaft 12. In this way, the rollers 26 rollably couple the shaft 12 with the housing 16. As intended by the present invention, the middle bearing 24 is essentially an excitation bearing and the left and right bearings 24 are pickup bearings. In other words, flux passes through the middle bearing 24 first, then to the left and right bearings, and then to the pickup coils 22.

FIG. 2 best shows that first, second, and third high magnetic permeability regions 30 are on the shaft 12 and are radially aligned with respective bearings 24. Accordingly, the high permeability regions are longitudinally separated from each other.

Between adjacent high permeability regions 30 and, thus radially aligned with respective sets of coils 18/22 are flux directing regions 32 that are configured for directing flux from the excitation coils 18 through the rollers 26 and back to the pickup coils 22. In the preferred embodiment, the flux directing regions include plural slots 34 each of which defines an oblique angle a relative to the longitudinal axis "L" of the shaft 12. In a particularly preferred embodiment, the angle α is forty five degrees (45°). Moreover, to correctly direct the flux, the slots 34 in the left-most flux directing region 32 shown in FIG. 2 are orthogonal to the slots in the right-most flux directing region 32.

Figure 4:
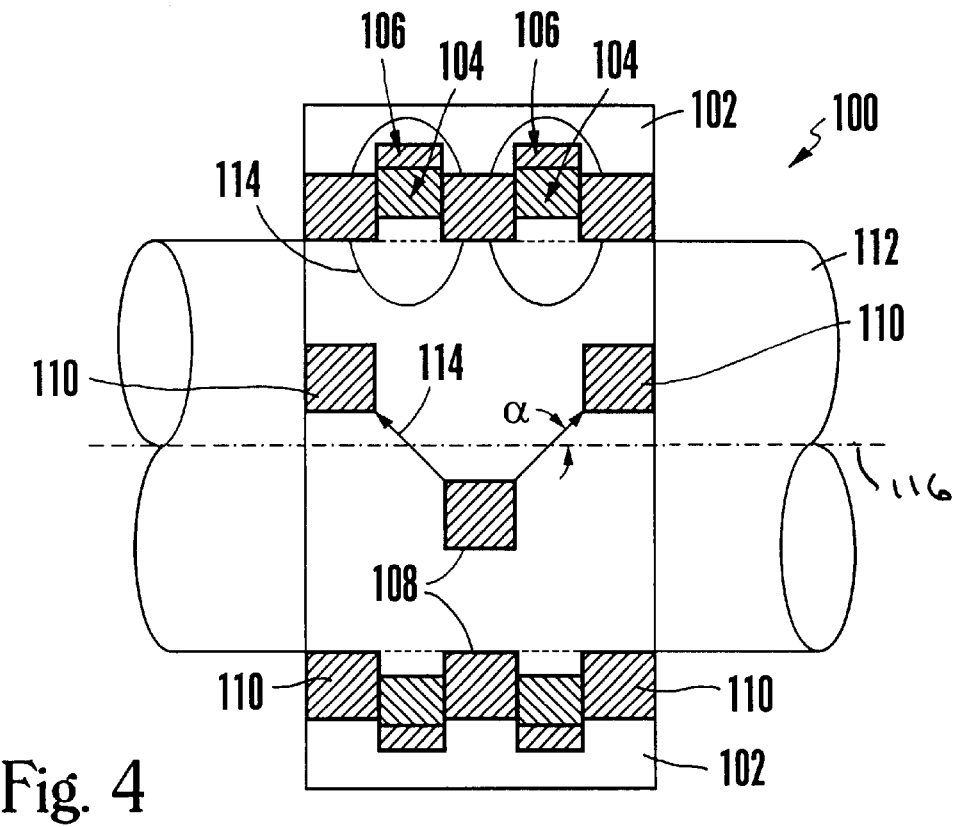
FIG. 4 is a schematic side cross-section view of a second embodiment of the torque sensing system, in operable engagement with a rotating shaft.
Figure 5:
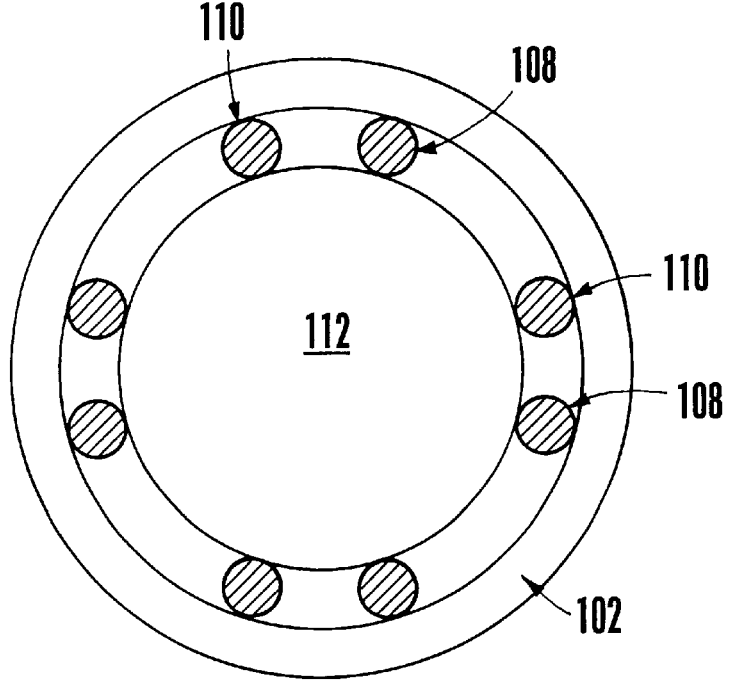
FIG. 5 is a schematic transverse cross-section view of the system shown in FIG. 4.

FIGS. 4 and 5 show an alternate system, generally designated 100. In the system 100 as shown in FIGS. 4 and 5, a hollow housing 102 holds plural excitation coils 104 with respective pickup coils 106. Also, the system 100 includes as many as three sets of three rollers each that can fit around the shaft, with each set establishing a bearing that includes a middle roller 108 and two side rollers 110. Pairs of coils 104, 106 are longitudinally staggered between adjacent roller sets as shown. The side rollers 110 can be thought of as front and rear rollers, since they are longitudinally spaced from each other. In any case, the rollers 108, 110 directly contact a shaft 112, with the rollers 108, 110 being disposed in the flux path, designated by flux lines 114, between the coils 104, 106.

While the side rollers 110 of a set are in a line that is parallel to the longitudinal axis 116 of the shaft 112, the middle roller 108 of each set is not aligned with the side rollers 110, as best shown in FIG. 2. Instead, the middle rollers 108 are offset from their respective side rollers 110 on the circumference of the shaft 112, to appropriately direct flux. More specifically, a line along the circumference of the shaft 112 from the middle roller 108 to either side roller 110 defines an angle α with respect to the axis 116 of forty five degrees (45°). It may now be appreciated that in accordance with present principles, the side rollers 110 are essentially pickup rollers and the middle rollers 108 are essentially excitation rollers.

Figure 6:
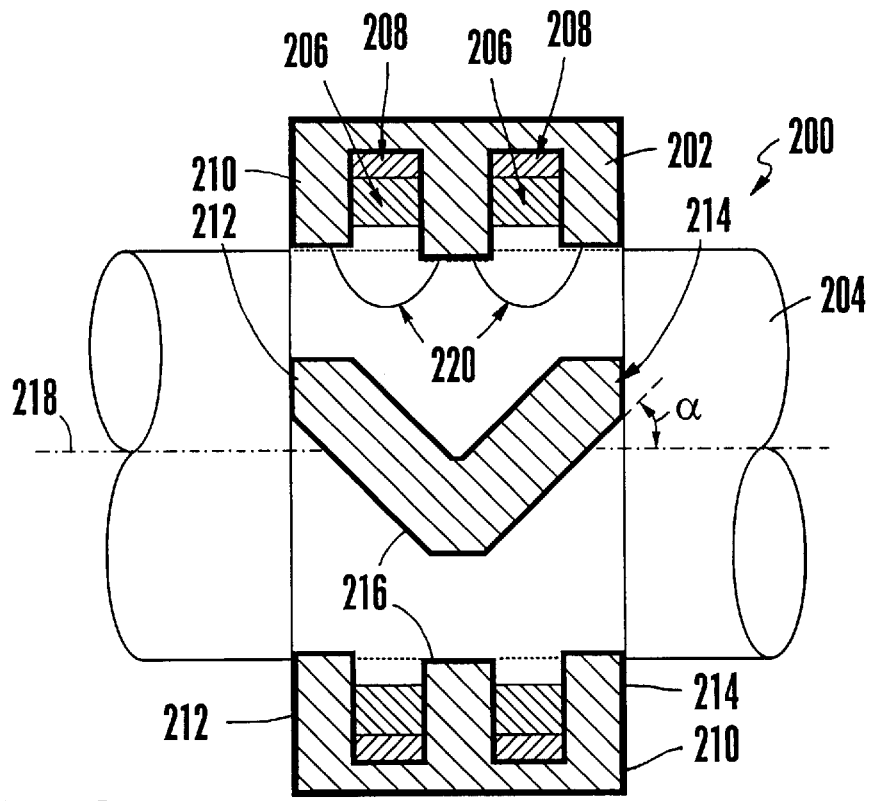
FIG. 6 is a schematic side cross-section view of a third embodiment of the torque sensing system, in operable engagement with a rotating shaft.
Figure 7:
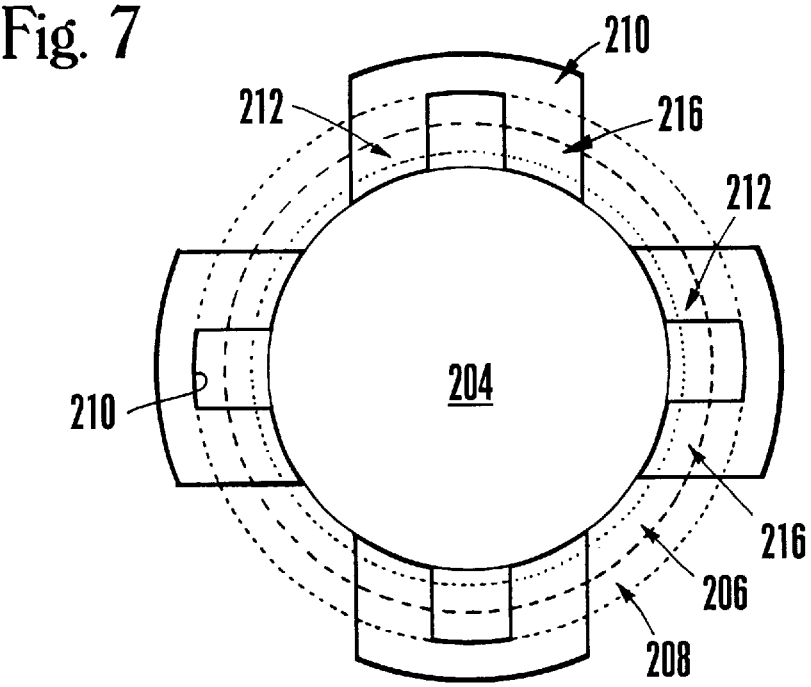
FIG. 7 is a schematic transverse cross-section view of the system shown in FIG. 6.

FIGS. 6 and 7 show yet another torque sensing system, generally designated 200, which, like the systems 10,100 described above, has no air gap in the flux path. A hollow sensor housing 202 surrounds a shaft 204, and the housing 202 holds two pairs of excitation coils 206 and associated pickup coils 208 arranged as set forth above in relation to the system 10 shown in FIGS. 2 and 3.

As shown, plural, preferably four, sensor cores 210 are held in the housing 202 to slidably contact the shaft 204 and thereby magnetically couple the shaft 204 and the coils 206, 208. Each sensor core 210 includes front and rear pickup poles 212, 214 and an excitation pole 216 longitudinally intermediate the pickup poles 212, 214 as shown best in FIG. 6. As shown, the coils 206, 208 are nested between the excitation pole 216 and respective pickup poles 212, 214.

In cross-reference to FIGS. 6 and 7 regarding the preferred embodiment, the front and rear pickup poles 212, 214 of a sensor core 210 define a line that is parallel to the longitudinal axis 218 of the shaft 204, whereas the excitation pole 216 of the core is offset from the pickup poles to appropriately direct flux, denoted by flux lines 220. Accordingly, each sensor core 210 forms a "V" shape in the longitudinal dimension as shown in FIG. 6. Consequently, a line between a pickup pole 212/214 and its associated excitation pole 216 establishes an angle α of 45° with respect to the axis 218.

In the preferred embodiment, the sensor cores 210 are made of highly permeable powder metal having spherical powder constituents, or a ferromagnetic plastic material, or any material that is softer than the shaft. The powder constituents are very small, preferably having diameters of less than three microns (<3 μ).

With the flux coupling members (i.e., rollers, poles, or bearings) of the present invention being disposed in the flux path and touching the shaft, no air gap exists in the flux path. Consequently, the present sensors are comparatively more sensitive than conventional magnetostrictive sensors, and are also less susceptible to performance degradation in the presence of shaft run-out than are conventional magnetostrictive sensors.

While the particular SHAFT TORQUE SENSOR WITH NO AIR GAP as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

We claim:

1. A torque sensing system for generating an electrical signal representative of torque on a shaft defining a longitudinal axis and a radial dimension, comprising:
   at least one excitation coil connectable to a source of electricity to generate magnetic flux, the flux permeating the shaft when the excitation coil is juxtaposed with the shaft;
   at least one pickup coil configured to receive magnetic flux from the shaft, the flux defining a flux path from the excitation coil to the pickup coil; and
   at least one bearing engaging the shaft and disposed in the flux path such that no air gap exists in the flux path.

2. The system of claim 1, further comprising at least one sensor housing configured for surrounding the shaft, the housing holding the coils, wherein at least one pickup coil is disposed radially outwardly of at least one excitation coil and is aligned with the excitation coil, and further wherein the bearing includes plural rollers.

3. The system of claim 2, further comprising a bearing inner ring disposed between at least one roller and the shaft, the roller directly contacting the bearing inner ring to rollably engage the shaft with the housing.

4. The system of claim 3, further comprising at least first, second, and third high permeability regions on the shaft, the high permeability regions being longitudinally separated from each other by flux directing regions.

5. The system of claim 4, wherein the flux directing regions include plural slots, at least some slots defining an oblique angle relative to the axis.

6. The system of claim 5, wherein at least some slots define an angle with respect to the axis of forty five degrees (45°).

7. The system of claim 6, wherein the flux directing regions include at least first and second flux directing regions, and at least some slots in the first flux directing region are orthogonal to at least some slots in the second flux directing region.

8. The system of claim 4, further comprising first, second, and third bearings, each being aligned with a respective high permeability region and each coil being aligned with a respective flux directing region.

9. The system of claim 2, wherein the rollers directly contact the shaft.

10. The system of claim 9, wherein the shaft defines a longitudinal axis and at least one roller is a front roller, at least one roller is a rear roller longitudinally spaced from the front roller, and at least one roller is a middle roller disposed longitudinally between the front and rear rollers, a line from the middle roller to at least one of the front or rear rollers defining an angle with respect to the axis of forty five degrees (45°).

11. The system of claim 10, wherein the coils are longitudinally offset from the rollers.

12. A torque sensing system for generating an electrical signal representative of torque on a shaft defining a longitudinal axis and a radial dimension, comprising:
   at least one sensor housing configured for surrounding the shaft;
   at least one excitation coil in the housing and connectable to a source of electricity to generate magnetic flux, the flux permeating the shaft when the housing is surroundingly engaged with the shaft;
   at least one pickup coil positioned in the housing to receive magnetic flux from the shaft, the flux defining a flux path from the excitation coil to the pickup coil; and
   at least one pole disposed in the flux path and configured to slidably contact the shaft to magnetically couple the shaft and the coils.

13. The system of claim 12, wherein at least one pickup coil is disposed radially outwardly of at least one excitation coil and is aligned in the radial dimension with the excitation coil.

14. The system of claim 13, comprising at least one pickup pole and at least one excitation pole, the poles being disposed such that a line between the poles establishes an oblique angle with respect to a longitudinal axis of the shaft.

15. The system of claim 14, wherein the angle is a 45° angle.

16. The system of claim 14, further comprising at least first and second pickup poles, the excitation pole being disposed longitudinally between the pickup poles, the excitation pole and pickup poles together forming a "V" shape in the longitudinal dimension.

17. The system of claim 16, wherein the pickup poles and excitation pole establish a sensor core.

18. The system of claim 17, comprising plural longitudinally spaced sensor cores and associated coils.

19. The system of claim 12, wherein the pole is made of powder metal.

20. The system of claim 19, wherein the powder metal includes spherical powder constituents, each constituent having a diameter of less than three microns.

21. A system for measuring torque on a shaft, comprising:
   the shaft;
   at least one excitation coil juxtaposed with the shaft; and
   at least one pickup coil juxtaposed with the shaft, an airless flux path being defined from the excitation coil, to the shaft, and back to the pickup coil, the pickup coil generating a signal representative of torque on the shaft.

22. The system of claim 21, further comprising a flux coupling member in the flux path and touching the shaft such that no air gap exists in the flux path.

23. The system of claim 22, wherein the flux coupling member includes at least one roller.

24. The system of claim 22, wherein the flux coupling member includes at least one pole slidably engaged with the shaft.

25. The system of claim 22, further comprising at least one flux directing element establishing a forty five degree (45°) angle relative to the axis of the shaft.

26. A system for outputting a signal representative of torque on a shaft, comprising:

excitation means for generating magnetic flux permeating the shaft;

pickup means for sensing magnetic flux from the shaft and for generating a signal representative torque imposed thereon; and coupling means completing a flux path from the excitation means, to the shaft, and to the pickup means such that no air gap exists in the flux path.

\* \* \* \* \*